Figure 1:
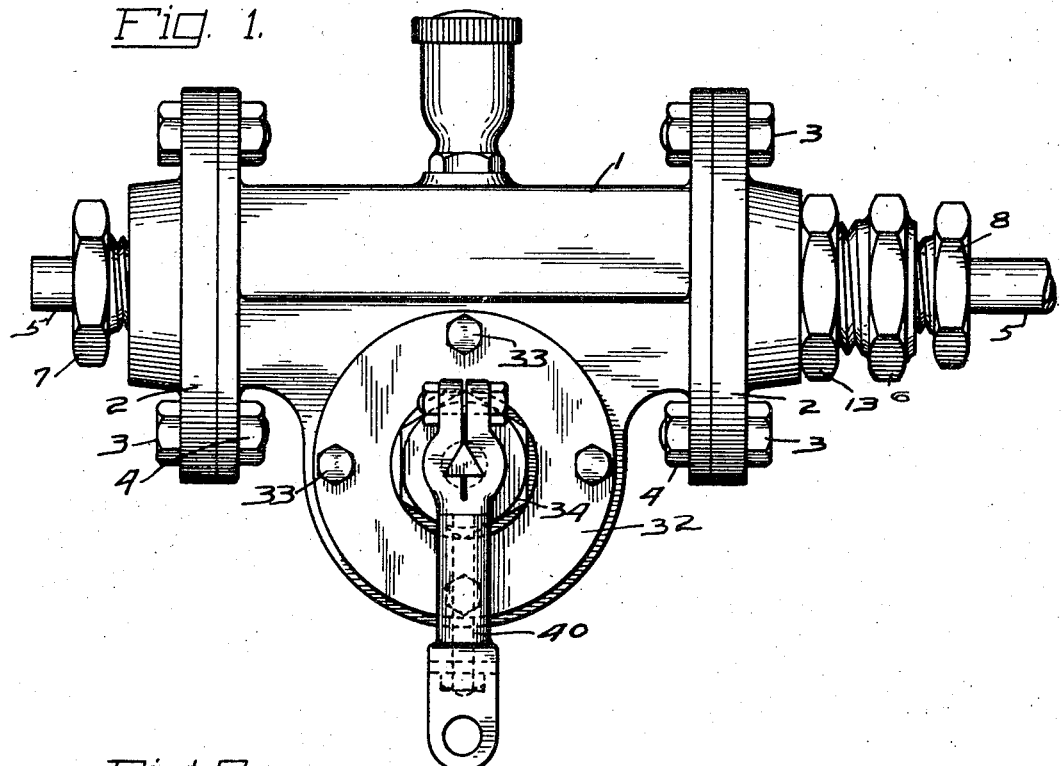

C. L. FLORA.
STEERING GEAR.
APPLICATION FILED JULY 5, 1916.

1,218,071.

Patented Mar. 6, 1917.
2 SHEETS—SHEET 1.

INVENTOR
Charles L. Flora,
by
Owen, Owen & Crampton

C. L. FLORA.
STEERING GEAR.
APPLICATION FILED JULY 5, 1916.
1,218,071.
Patented Mar. 6, 1917.
2 SHEETS—SHEET 2.
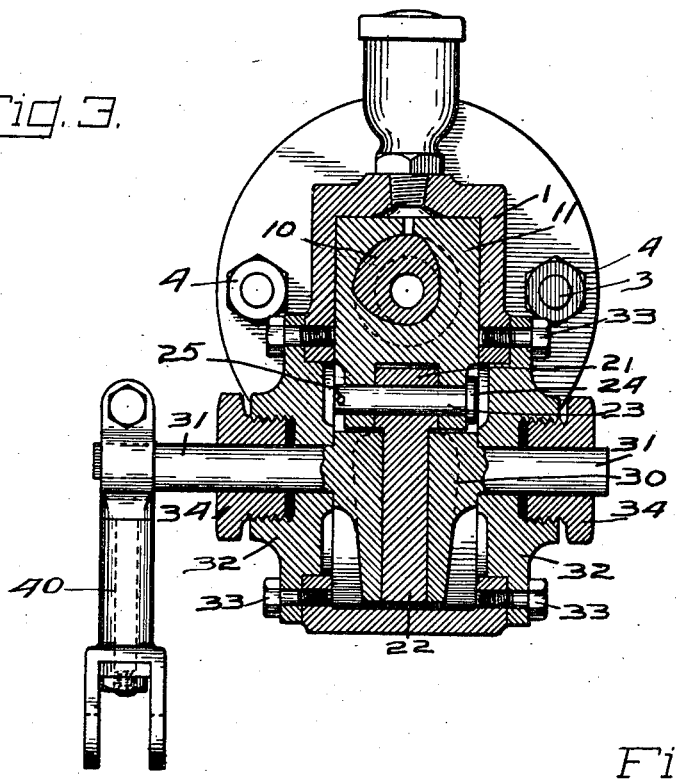
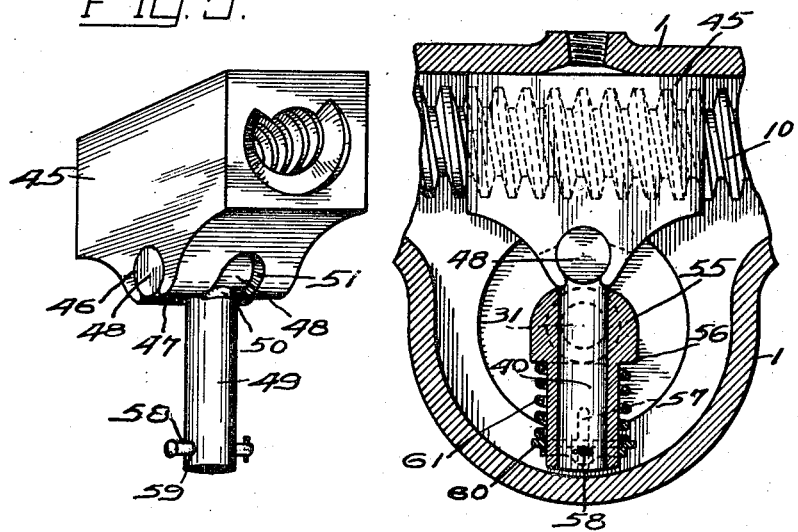
INVENTOR
Charles L. Flora,
by
Owen, Owen & Crampton

UNITED STATES PATENT OFFICE.

CHARLES L. FLORA, OF TOLEDO, OHIO, ASSIGNOR OF ONE-HALF TO FRED N. LAUBENTHAL, OF TOLEDO, OHIO.

STEERING-GEAR.

1,218,071.  Specification of Letters Patent.  Patented Mar. 6, 1917.

Application filed July 5, 1916. Serial No. 107,536.

*To all whom it may concern:*

Be it known that I, CHARLES L. FLORA, a citizen of the United States, and a resident of Toledo, in the county of Lucas and State of Ohio, have invented a certain new and useful Steering-Gear; and I do hereby declare the following to be a full, clear, and exact description of the invention, such as will enable others skilled in the art to which it appertains to make and use the same, reference being had to the accompanying drawings, and to the characters of reference marked thereon, which form a part of this specification.

My invention relates to automobile steering gears. It has for its object to provide a gear that will have no looseness of play between the parts thereof. It also has for its object to provide an efficient steering mechanism which may be easily made and at a small cost, and readily assembled.

Constructions containing the invention may partake of various forms. I have selected two forms of construction and will describe them hereinafter.

The constructions selected are illustrated in the drawings, wherein—

Figure 2:
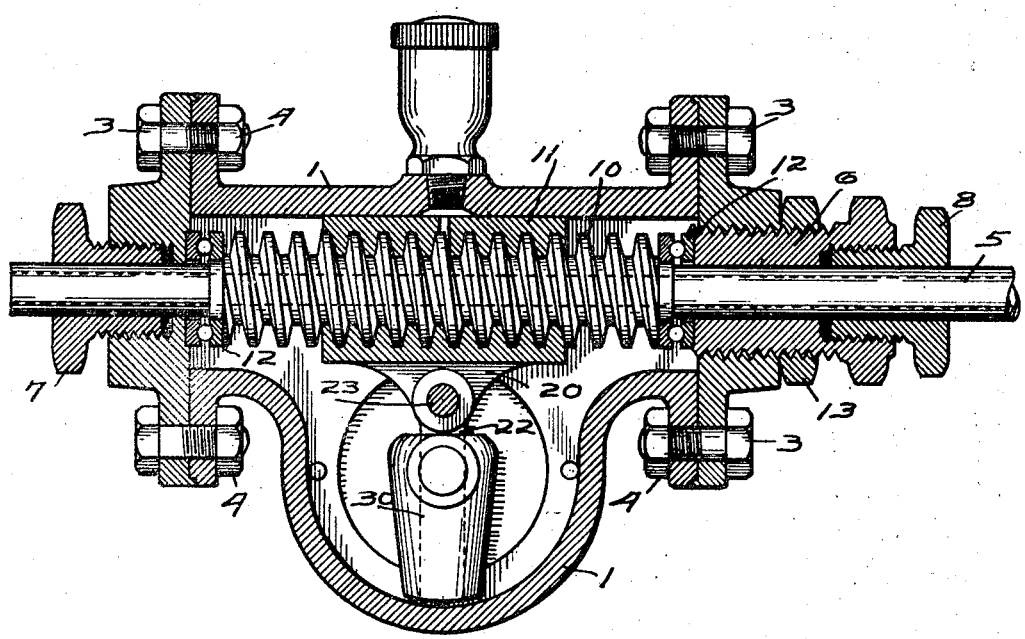

Figure 1 illustrates a side view of the construction. Fig. 2 illustrates a longitudinal sectional view. Fig. 3 illustrates a transverse sectional view. Figs. 4 and 5 illustrate, respectively, sectional views and perspective views of a modification of the construction shown in the other figures.

1, Fig. 1, is a shell which is closed by the heads 2. The heads 2 are bolted to end flanges of the shell 1 by means of the bolts 3 which are threaded into the flanges and are secured also by nuts 4. A steering rod or sleeve 5, which is connected to the steering wheel of the automobile or other conveyance, extends through the shell 1 and the heads 2. The bushing 6 is threaded into one of the heads 2, and the bushing 7 is threaded into the other head. The bushing 8 is also threaded into the bushing 6. The bushings 7 and 8 form packing boxes for tightening and closing or sealing the interior of the shell 1, which may be filled with oil or grease to keep the parts lubricated. The bushings and the heads form bearings for the sleeve 5.

The sleeve 5 is provided with a threaded portion 10, which operates on the block 11 to shift the block along the shell 1 for steering the automobile or other conveyance. Ball thrust bearings 12 are located at the ends of the threaded portion 10 and intermediate one of the heads 2 and the adjustable bushing 6. The adjustable bushing is secured in its adjusted position by means of the nut or bur 13. The block 11 fits into the upper portion of the shell 1 and slides therein, the three sides of the shell forming a bearing for the block 11. The lower end of the block is provided with a pair of lugs 20, between which is located the head 21 of the pin 22. A pin 23 having the flattened head 24 at one end and the key pin 25 at the other end extends through the lugs 20 and the head 21.

The pin 22 extends downward through a socket 30. The upper end of the socket is located in close proximity to the lower ends of the lugs 20 and the pin 23. When the block 11 is shifted by a turning of the sleeve 5, it turns the socket 30 and draws the pin 22 from the socket when the pin 23 passes over the center of the socket. The pin 22 and the socket 30 are made of sufficient length to permit the block 11 to be shifted as far as may be required for giving as sharp a turn to the conveyance as needed, and yet to allow a sufficient bearing between the pin 22 and the socket 30.

The socket 30 forms a part of the shaft 31 which extends transversely through the case 1. It is supported on caps 32, which are bolted to the casing 1 by means of the bolts 33. Bushings 34 forming packing boxes are threaded into the caps 32 and also tightly seal the interior to prevent the escape of oil or other lubricant. The caps 32 and the bushings 34 form bearings for the shaft 31. An arm 40 is secured to the shaft 31 in any suitable way. The steering knuckles are connected together by a tie rod and the tie rod is connected to the arm 40 in the manner well known in the art, so that when the sleeve 5 is turned by the steering wheel the block 11 is shifted, which causes rotation of the socket 30 and consequently rotation of the shaft 31 and the arm 40.

In the form of construction shown in Figs. 4 and 5 the threaded block 45 which is operated by means of the screw 10 is provided with a transversely extending opening 46 formed in an enlarged portion of the block 45. A slot 47 is cut through the bottom of the block 45 to the opening 46. The head 48 of the pin 49 is inserted in the opening 46. The head 48 is preferably substantially the same length as the width of the block, thus forming a large area for communicating pressure exerted by the block 45 on the head 48 of the pin 49 in steering the conveyance. The pin 49 may be provided with a small cut 50 located on each side of the head 48 near the point of union between the head 48 and the pin 49, in order that the enlarged portion of the block 45 may more nearly surround and inclose the head 48 of the pin, and the head of the pin may be inserted in the opening 46. A longitudinally cut channel 51 is formed in the block 45 to allow sufficient rotatable movement of the pin 49 within the opening 46 and permit the block 45 to move so as to give the requisite sharp turn of the conveyance when the steering wheel is turned to its extreme point. The pin 49 is located in a thimble or socket member 55 which is supported on a shaft 31 in the same way that the socket member 30 is supported on its shaft 31 as shown in Fig. 3. The socket member 55 is provided with a shoulder 56 and a slot 57, while the pin 49 is provided with a pin 58 extending through the opening 59, which is located in the slot 57. A collar 60 surrounds the socket member. The pin 58 also extends through the collar 60. Intermediate the collar 60 and the shoulder 56 is located a spring 61 which presses against the shoulder 56 and the collar 60. The pressure spring 61 operates to draw the pin 49 in the socket 55 and pull the head 48 against the lower side of the opening 46, and thus tightly hold the shaft 31 against its bearings, the head 48 against its bearings and the block 45 against the screw 10, and the sleeve 5 against its bearings. The spring thus operates to tightly hold all of the parts together and prevent any loose play of the parts.

The particular constructions illustrated may be further modified by those skilled in the art without departing from the spirit of the invention.

Having thus described my invention, what I claim as new, and desire to secure by Letters Patent, is—

1. In a steering gear, the combination of a pivotally supported socket member, a pin located in the socket member, a block, a screw for shifting the block, one end of the pin secured in the block, and a spring for holding the pin against its bearings.

2. In a steering gear, the combination of a threaded block and a threaded member for shifting the block, a pin having a head extending transversely to the block and secured in the block, a socket member having a shaft, a casing for supporting the threaded member and the shaft, a spring for drawing the threaded member, the head and the shaft against their bearing parts, and the block against the threaded member.

3. In a steering gear, the combination of a threaded member, a block shifted by the threaded member and having a transverse opening extending therethrough, a pin having a head, the head of the pin having a length substantially the same as the width of the block and located in the opening, a socket member in which the pin is located, and a shaft for supporting the socket member.

4. In a steering gear, the combination of a threaded member, a block shifted by the threaded member and having a transverse opening extending therethrough, a pin having a head, the head of the pin having a length substantially the same as the width of the block and located in the opening, a socket member in which the pin is located, a shaft for supporting the socket member, the socket member having a slot and a shoulder, a collar surrounding the socket member and secured to the pin, and a spring located intermediate the shoulder and the collar for drawing the head of the pin against the block.

In testimony whereof, I have hereunto signed my name to this specification.

CHARLES L. FLORA.